(12) United States Patent
Kenis et al.

(10) Patent No.: US 7,635,530 B2
(45) Date of Patent: *****Dec. 22, 2009

(54) MEMBRANELESS ELECTROCHEMICAL CELL AND MICROFLUIDIC DEVICE WITHOUT PH CONSTRAINT

(75) Inventors: Paul J. A. Kenis, Champaign, IL (US); Andrzej Wieckowski, Champaign, IL (US); Eric R. Choban, St. Paul, MN (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 347 days.

This patent is subject to a terminal disclaimer.

(21) Appl. No.: 11/085,621

(22) Filed: Mar. 21, 2005

(65) Prior Publication Data

US 2006/0210867 A1    Sep. 21, 2006

(51) Int. Cl.
*H01M 8/04* (2006.01)
*H01M 8/08* (2006.01)
(52) U.S. Cl. .............................. 429/13; 429/15; 429/34; 429/38; 429/39; 429/46
(58) Field of Classification Search .................. None
See application file for complete search history.

(56) References Cited

U.S. PATENT DOCUMENTS

| | | | |
|---|---|---|---|
| 3,849,275 A | 11/1974 | Candor | |
| 3,902,916 A | 9/1975 | Warszawski | |
| 4,066,526 A | 1/1978 | Yeh | |
| 4,311,594 A | 1/1982 | Perry | |
| 4,652,504 A | 3/1987 | Ando | |
| 4,732,823 A | 3/1988 | Ito et al. | |
| 4,783,381 A | 11/1988 | Tytgat et al. | |
| 5,185,218 A | 2/1993 | Brokman et al. | |
| 5,413,881 A | 5/1995 | Licht et al. | |
| 5,534,120 A | 7/1996 | Ando et al. | |
| 5,648,183 A | 7/1997 | Licht et al. | |
| 5,858,567 A | 1/1999 | Spear, Jr. et al. | |
| 5,863,671 A | 1/1999 | Spear, Jr. et al. | |
| 5,952,118 A | 9/1999 | Ledjeff et al. | |
| 6,054,427 A | 4/2000 | Winslow | |

(Continued)

FOREIGN PATENT DOCUMENTS

| | | |
|---|---|---|
| JP | 2005-515602 | 5/2005 |
| WO | WO 00/15872 | 3/2000 |
| WO | WO 01/37357 | 5/2001 |
| WO | WO 03/061037 | 7/2003 |
| WO | WO 03/106966 A2 | 12/2003 |
| WO | WO 2005/001975 | 1/2005 |
| WO | WO 2005/004262 A2 | 1/2005 |
| WO | WO 2006/101967 | 9/2006 |

OTHER PUBLICATIONS

J. L. Cohen et al., "A Dual Electrolyte H2/O2 Planar Membraneless Microchannel Fuel Cell System with Open Circuit Potentials in Excess of 1.4 V," Lagmuir (21), 3544-3550, available online Mar. 16, 2005.*

(Continued)

*Primary Examiner*—Jonathan Crepeau
(74) *Attorney, Agent, or Firm*—Evan Law Group LLC

(57) ABSTRACT

An electrochemical cell, comprises (a) a first electrode, (b) a second electrode, (c) a first fluid, in contact with the first electrode, and (d) a second fluid, in contact with the second electrode. The first fluid and the second fluid are in parallel laminar flow, and the first fluid has a pH different from the second fluid.

17 Claims, 5 Drawing Sheets

U.S. PATENT DOCUMENTS

| | | | |
|---|---|---|---|
| 6,242,123 B1 | 6/2001 | Nezu et al. | |
| 6,312,846 B1 | 11/2001 | Marsh et al. | |
| 6,432,918 B1 | 8/2002 | Winslow | |
| 6,472,091 B1 | 10/2002 | Konrad et al. | |
| 6,607,655 B1 | 8/2003 | Lowe et al. | |
| 6,713,206 B2* | 3/2004 | Markoski et al. | 429/38 |
| 7,205,064 B2* | 4/2007 | Markoski et al. | 429/46 |
| 7,252,898 B2 | 8/2007 | Markoski et al. | |
| 2002/0028372 A1 | 3/2002 | Ohlsen et al. | |
| 2002/0041991 A1 | 4/2002 | Chan et al. | |
| 2003/0003336 A1 | 1/2003 | Colbow et al. | |
| 2003/0134163 A1 | 7/2003 | Markoski et al. | |
| 2003/0198858 A1* | 10/2003 | Sun et al. | 429/43 |
| 2004/0058217 A1 | 3/2004 | Ohlsen et al. | |
| 2004/0072047 A1 | 4/2004 | Markoski et al. | |
| 2004/0265681 A1 | 12/2004 | Markoski et al. | |
| 2005/0084737 A1* | 4/2005 | Wine et al. | 429/38 |
| 2005/0252784 A1 | 11/2005 | Choban et al. | |
| 2006/0035136 A1 | 2/2006 | Markoski et al. | |
| 2006/0228622 A1* | 10/2006 | Cohen et al. | 429/101 |

OTHER PUBLICATIONS

Kelley et al., "Miniature Fuel Cells Fabricated on Silicon Substrates," AIChE Journal 48, pp. 1071-1082, 2002.

Maynard et al., "Miniature fuel cells for portable power: Design considerations and challenges," J. Vac. Sci. Technol., B 20(4), pp. 1287-1297, 2002.

Steele et al., "Materials for fuel-cell technologies", Nature, vol. 414, pp. 345-352, 2001.

Lu et al., Development and characterization of a silicon-based micro direct methanol fuel cell, Electrochimica Acta 49, pp. 821-828, 2004.

Yeom et al., "Microfabrication and characterization of a silicon-based millimeter scale, PEM fuel cell operating with hydrogen, methanol, or formic acid," Sensors and Actuators, B, 107, pp. 882-891, 2005.

Lee et al., "Design and fabrication of a micro fuel cell array with "flip-flop" interconnection," Journal of Power Sources, 112, pp. 410-418, 2002.

Hahn et al., "Development of a planar micro fuel cell with thin film and micropatterning technologies," Journal of Power Sources, 131, pp. 73-78, 2004.

Mitrovski et al., "Microfluidic Devices for Energy Conversion: Planar Integration and Performance of a Passive, Fully Immersed $H_2$—$O_2$ Fuel Cell," *Langmuir*, 20, pp. 6974-6976, 2004.

Meyers et al., "Design considerations for miniaturized PEM fuel cells," Journal of Power Sources, 109, pp. 76-88 2002.

Kelley et al., "A Miniature Methanol/Air Polymer Electrolyte Fuel Cell," Electrochemical and Solid-State Letters, 3(9), pp. 407-409, 2000.

Yen et al., "A micro methanol fuel cell operating at near room temperature," Applied Physics Letters, vol. 83, No. 19, pp. 4056-4058, 2003.

Motokawa et al., MEMS-based design and fabrication of a new concept micro direct methanol fuel cell (μ-DMFC), Electrochemistry Communications, 6, pp. 562-565, 2004.

Ha, et al., "A miniature air breathing direct formic acid fuel cell," Journal of Power Sources, 128, pp. 119-124, 2004.

Choban et al., "Microfluidic fuel cell based on laminar flow," Journal of Power Sources, 128, pp. 54-60, 2004.

Kenis et al., "Microfabrication Inside Capillaries Using Multiphase Laminar Flow Patterning," Science, vol. 285 pp. 83-85, 1999.

Ismagilov et al., "Experimental and theoretical scaling laws for transverse diffusive broadening in two-phase laminar flows in microchannels," Applied Physics Letters, vol. 76, No. 17, pp. 2376-2378, 2000.

Kamholz et al., "Quantitative Analysis of Molecular Interaction in a Microfluidic Channel: The T-Sensor," Anal. Chem., 71, pp. 5340-5347, 1999.

Kenis et al., "Fabrication inside Microchannels Using Fluid Flow," Acc. Chem. Res., 33, pp. 841-847, 2000.

Ferrigno et al., "Membraneless Vanadium Redox Fuel Cell Using Laminar Flow", J. Am. Chem. Soc. 124, pp. 12930-12931, 2002.

Krishnan et al., "Microfabricated reaction and separation systems", Current Opinion in Biotechnology 12, p. 92, 2001.

Zheng et al., "Formation of Arrayed Droplets by Soft Lithography and Two-Phase Fluid Flow, and Application in Protein Crystallization," Adv. Mater., 16, No. 15, 1365-1368, 2004.

Cohen et al., "Fabrication and preliminary testing of a planar membraneless microchannel fuel cell", J. Power Sources, 139, pp. 96-105, 2005.

Spendelow et al., "Electrooxidation of adsorbed CO in Pt(1 1 1) and Pt(1 1 1)/Ru in alkaline media and comparison with results from acidic media," Journal of Electroanalytical Chemistry, 568, pp. 215-224, 2004.

McLean et al., "An assessment of alkaline fuel cell technology," International Journal of Hydrogen Energy, 27, pp. 507-526, 2002.

Prabhuram et al., "Investigation of methanol oxidation on unsupported platinum electrodes in strong alkali and strong acid," Journal of Power Sources, 74, pp. 54-61, 1998.

Tripkovic et al., "Methanol oxidation at platinum electrodes in alkaline solution: comparison between supported catalysts and model systems," Journal of Electroanalytical Chemistry, 572, pp. 119-128, 2004.

Agel et al., "Characterization and use of anionic membranes for alkaline fuel cells," Journal of Power Sources, 101, pp. 267-274, 2001.

Wang et al., "A feasibility analysis for alkaline membrane direct methanol fuel cell: thermodynamic disadvantages versus kinetic advantages," Electrochemistry Communications, 5, 662-666, 2003.

Danks et al., "Alkaline anion-exchange radiation-grafted membranes for possible electrochemical application in fuel cells," J. Mater. Chem., 13, pp. 712-721, 2003.

Yu et al., "Development of direct methanol alkaline fuel cells using anion exchange membranes," Journal of Power Sources, 137, pp. 248-256, 2004.

Iwasita, "Electrocatalysis of methanol oxidation", Electrochim. Acta 47, pp. 3663-3674, 2002.

Barton et al., "Enzymatic Biofuel Cells for Implantable and Microscale Devices," Chem. Rev., 104, pp. 4867-4886, 2004.

Astris Energi Inc., "Advantages of the Alkaline Fuel Cell," can be located at: http://www.fuelcellmarkets.com/article_default_view. fcm ?articleid=6194&subsite=912, 1 page, 2005.

Chen et al., "A Miniature Biofuel Cell," J. Am. Chem. Soc., 123, pp. 8630-8631, 2001.

Mano et al., "A Miniature Biofuel Cell Operating in a Physiological Buffer," J. Am. Chem. Soc., 124, pp. 12962-12963, 2002.

Kim et al., "A Miniature Membrane-less Biofuel Cell Operating under Physiological Conditions at 0.5 V," A. J. Electrochem. Soc. 150 (2), A209-A213, 2003.

Mano et al., "A Miniature Membraneless Biofuel Cell Operating at 0.36 V under Physiological Conditions," Journal of the Electrochemical Society, 150, 8, pp. A1136- A1138, 2003.

Mano et al., "Characteristics of a Miniature Compartment-less Glucose-O2 Biofuel Cell and Its Operation in a Living Plant," J. Am. Chem. Soc., 125, pp. 6588-6594, 2003.

Choban et al., "Characterization of Limiting Factors in Laminar Flow-Based Membraneless Microfuel Cells," Electrochemical and Solid State Letters,8 (7), pp. A348-A352, 2005.

Choban et al., "Membraneless laminar flow-based micro fuel cells operating in alkaline, acidic, and acidic/alkaline media," Electrochimica Acta, vol. 50, No. 27, pp. 5390-5398, 2005.

Cohen et al., "A Dual Electrolyte H2/O2 Planar Membraneless Microchannel Fuel Cell System with Open Circuit Potentials in Excess of 1.4 V," Lagmuir 21, pp. 3544-3550, available online Mar. 16, 2005.

Skoog et al., "Electrochemical Cells," Fundamentals Of Analytical Chemistry , CBS College Publishing, 4th ed., p. 306, 1982.

FCTec, "Alkaline Fuel Cells (AFC)," can be located at: http://www. fctec.com/fctec_types_afc.asp, 1 page, 2005.

Tse, "Alkaline Fuel Cell," can be located at: http://www. visionengineer.com/env/al.php, 1 page, 2005.

Neah Power Systems, located at www.neahpower.com, 42 pages, 2003-2004.

INI Power Systems, located at www.inipower.com, 3 pages, 2004.

Yeom et al., "A Silicon Microfabricated Direct Formic Acid Fuel Cell," ASME Fuel Cell Science, Engineering and Technology Proceedings, pp. 267-272, 2003.

Yeom et al., "A Microscale Vapor-Fed Formic Acid Fuel Cell," Solid-State Sensors and Actuators Workshop, Hilton Head Island, SC, pp. 125-128, Jun. 2004.

Choban et al., "Membraneless Fuel Cell Based on Laminar Flow," ASME Fuel Cell Science, Engineering and Technology Proceedings, pp. 261-265, 2003.

Choban et al., "Microfluidic Fuel Cells That Lack a PEM," Power Sources Proceedings, 40, pp. 317-320, 2002.

Invitation to Pay Additional Fees and Partial Search Report dated Feb. 5, 2007 for PCT application number PCT/US2006/009502, 9 pages.

International Search Report dated May 29, 2006 for application number PCT/US2004/020597.

M. Mench, et al, "Design of Micro Direct Methanol Fuel Cell (Proceedings of the IMECE'01, Nov. 11-16, 2001)", 2001, The American Society of Mechanical Engineers, New York XP002282851.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Carrette et al, "Fuel Cells-Findamentals and Applications," Fuel Cells, 2001, p. 5-39, vol. I.

Duffy et al, "Rapid Prototyping of Microfluidic Systems in Poly(dimethylsiloxane),"Anal. Chem, 1998, pp. 4974-4984, vol. 70.

EG&G Services et al, Fuel Cell Handbook, Fifth Edition, 2000, U.S. Department of Energy, Office of Fossil Energy, National Energy Technology Laboratory, pp. I-xiii, 1-1 to 12-4.

Heinzel et al, "A Review of the State-of-the-Art of the Methanol Crossover in Direct Methanol Fuel Cells," J. Power Sources, 1999, pp. 70-74, vol. 84.

Kim et al, "Diffusion-Based Sample Cleanup Microchip for Protein Analysis by Electrospray Ionization Mass Spectrometry," obtained at http://pittcon.omnibooksonline.comR001/papers/0226.pdf as of at least Jul. 24, 2001,2 pages.

Pickett et al, "Ionic Mass Transfer in Parallel Plate Electrochemical Cells," J. Applied Electrochemistry, 1972, pp. 151-156, vol. 2.

Thomas et al, "Los Alamos National Laboratory Monograph LA-UR-99-3231," Fuel Cells: Green Power, 1999, p. 1-33.

Waszczuk et al, "Methanol Electrooxidation on Platinum-RutheniumNanoparticle Catalysts," J. Catalysis, 2001, pp. 1-6, vol. 203.

Zhao et al, "Surface-Directed Liquid Flow Inside Microchannels," Science, 2001, pp. 1023-1026, vol. 291.

Markoski, "Summary of Knowledge About Laminar Flow Fuel Cells," 2002, 1 page.

Ro et al, "Sample Clean-Up Using Multiphase Laminar Microfluidics for Electrospray Ionization Mass Spectrometry," obtained at http://nanotech.osu.edu/abstracts/hahn.htm as of at least Jul. 24, 2001, 2 pages.

Delphion search conducted Oct. 23, 2002, for U.S. patents containing "perfluorocarbon" and fuel cell in the claims, 1 page.

Delphion search conducted Oct. 23, 2002, for U.S. patents containing "fuel cell and oxygen carrier' and perfluror", 1 page.

Delphion search conducted Aug. 23, 2002, for U.S. patents and applications containing "pefluoro" and "ballard",1 page.

Delphion search conducted Aug. 23, 2002, for U.S. patents containing "perflurocarbons", 2 pages.

Davis, "NISTIR 6848, Proposed Testing Methodology and Laboratory Facilities for Evaluating Residential Fuel Cell Systems," NIST, 2002, 14 pages.

Dupont Zonyl FS-62, Fluorosurfactant Information Sheet, 2001, 2 pages.

Riess et at, °Solubility and Transport Phenomena in Perfluorochemicals Relevant to Blood Substitution and Other Biomedical Applications, Pure & Appl. Chem, 1982, pp. 2383-2406, vol. 54.

Wesseler et al, The Solubility of Oxygen in Highly Fluorinated Liquids, J. Fluorine Chem, pp. 137-146, vol. 9.

Gang, X, et al, "Electrolyte additives for phosphoric acid fuel cells", Journal of the Electrochemical Society, vol. 140, No. 4, pp. 896-902, (1993).

International Search Report dated Dec. 13, 2005 for PCT application number PCT/US2004/020342.

Kronberger, H, et al, "Reduction of oxygen from electrolyte emulsions with high oxygen contents", Journal of Power Sources, vol. 86, pp. 562-567, (2000).

International Search Report dated Jun. 21, 2004 for PCT application number PCT/US2003/00226.

* cited by examiner

MEMBRANELESS ELECTROCHEMICAL CELL AND MICROFLUIDIC DEVICE WITHOUT PH CONSTRAINT

BACKGROUND

Most fuel cells presently being studied are polymer electrolyte membrane (PEM)-based systems. A membrane, such as NAFION®, separates the cathode and anode compartments, preventing fuel from diffusing toward and reacting at the wrong electrode. At the same time this PEM allows protons ($H^+$) to diffuse from the anode to the cathode. The cathode and anode electrodes are formed by applying catalyst (such as Pt or alloys of Pt) to both sides of the membrane. The resulting catalyst-covered membrane is referred to as the membrane-electrode assembly (MEA).

Hydrogen has been the preferred fuel for fuel cells. In order to obtain lightweight micro fuel cells with high specific energy densities, hydrogen gas must be stored under high pressure, which requires a special container, and safety issues related to pressure and flammability have to be taken into account [8-11].

Safer high energy density fuels are certain hydrocarbons such as methanol and formic acid, since they can be stored in liquid form under ambient conditions. Hence, most studies toward micro fuel cells focus on the development of microfluidic direct methanol fuel cells (µ-DM-FCs) [4,12-14], and direct formic acid fuel cells (µ-DFA-FCs) [5-7,15]. While the performance of these µ-DM-FC and µ-DM-FA prototypes is promising, several technical issues associated with their development and operation (e.g. fuel crossover, membrane dry out, and cathode flooding) remain [16].

The reaction kinetics of both fuel oxidation and oxygen reduction are known to be better (i.e. faster) in alkaline media than in acidic media. Better kinetics can immediately lead to better performance. In addition, the chemistry of fuel cells in alkaline media allow the use of less precious materials as the catalysts (e.g. Ni or Ag instead of Pt) [44-46]. In alkaline media the fuel oxidation and oxygen reduction reactions are slightly different: at the cathode hydroxide ions are formed during the electro-reduction of oxygen. These hydroxide ions diffuse through the PEM towards the anode. At the anode during the electro-oxidation of fuel these hydroxide ions are consumed.

Presently, almost all PEM-based fuel cells are run in acidic media. It has proven difficult to obtain alkaline media compatible membranes that are (i) capable of transporting hydroxide ions ($OH^-$), and (ii) capable of preventing fuel from crossing over to the cathode (fuel crossover), a process detrimental to fuel cell performance. In addition, carbon dioxide ($CO_2$) forms at the anode which reacts with $OH^-$ to produce poorly soluble carbonate ions ($CO_3^{2-}$), eventually resulting in precipitation of carbonate salt [44-46]. This quickly leads to clogging of the pores of the membrane-electrode assembly. Therefore, alkaline fuel cells use hydrogen to avoid these problems.

There are several types of fuel cells that do not have a PEM. Laminar flow fuel cells use parallel laminar flow between two streams of liquid to create an interface between the streams, which replaces the PEM or salt bridge of conventional devices [48,49]. When the first stream, containing an oxidizer, comes into contact with the first electrode, and the second stream, containing the fuel, comes into contact with the second electrode, a current is produced, while charge migration from the anode to the cathode occurs through the interface. This cell design minimizes crossover by maximizing consumption of the fuel before it diffuses into the oxidant stream. When run as an electrolytic cell (rather than as a galvanic cell), these microfluidic devices can be used for synthesis [47].

A different micro fuel cell concept that also lacks a PEM has been reported [10]. Delivery of fuel (hydrogen) and oxidant (oxygen) relies on diffusive transport through a permeable polydimethylsiloxane (PDMS) membrane that is placed on both the anode and cathode, while the anode and cathode compartments are connected via tiny microfluidic channels. The high permeability of PDMS for oxygen and hydrogen provides a significant advantage in overcoming mass transfer limitations.

Biofuel cells, having immobilized enzymes and mediators on the electrode, may also avoid the need for a PEM. Here, the specificity of the enzymes prevents reaction of the fuel at the wrong electrode. A flaw with these systems is that two different enzymes, one at the anode and the other at the cathode, are used in a common liquid media, so that the pH of the system is selected to optimize the overall system, and is typically suboptimal for one or both of the enzymes [41].

SUMMARY

In a first aspect, the invention is an electrochemical cell, comprising: (a) a first electrode, (b) a second electrode, (c) a first fluid, in contact with the first electrode, and (d) a second fluid, in contact with the second electrode. The first fluid and the second fluid are in parallel laminar flow, and the first fluid has a pH different from the second fluid.

In a second aspect, the present invention is a fuel cell, comprising: (a) an anode, (b) a cathode, (c) an anodic fluid, in contact with the anode, and (d) a cathodic fluid, in contact with the cathode. The anodic fluid and the cathodic fluid are in parallel laminar flow, and at least one of the anodic fluid and the cathodic fluid has a pH above 7.5.

In a third aspect, method of generating electricity, comprising flowing a first and second liquid through a channel in parallel laminar flow. The first fluid is in contact with a first electrode and the second liquid is in contact with a second electrode, complementary half cell reactions take place at the first and the second electrodes, respectively, and a precipitate is produced.

In a fourth aspect, the present invention is a fuel cell, comprising: (a) an anode, (b) a cathode, (c) an anodic fluid, in contact with the anode, and (d) a cathodic fluid, in contact with the cathode. The anodic fluid has a pH different from the cathodic fluid, and ions travel from the anodic fluid to the cathode fluid or from the cathodic fluid to the anodic fluid, without traversing a membrane.

Definitions

Electrochemical cells are classified as galvanic if they produce electrical energy (such as a fuel cell or battery), and as electrolytic if their operation requires electrical energy from an external source [50].

A working stream is a stream of fluid that is in contact with the working electrode. A counter stream is a stream of fluid that is in contact with the counter electrode. Similarly, an anodic stream is a stream of fluid that is in contact with the anode, and a cathodic stream is a stream of fluid that is in contact with the cathode.

Electrolytic synthesis is the synthesis of compound by the application of an electric potential.

DETAILED DESCRIPTION

Figure 1A:
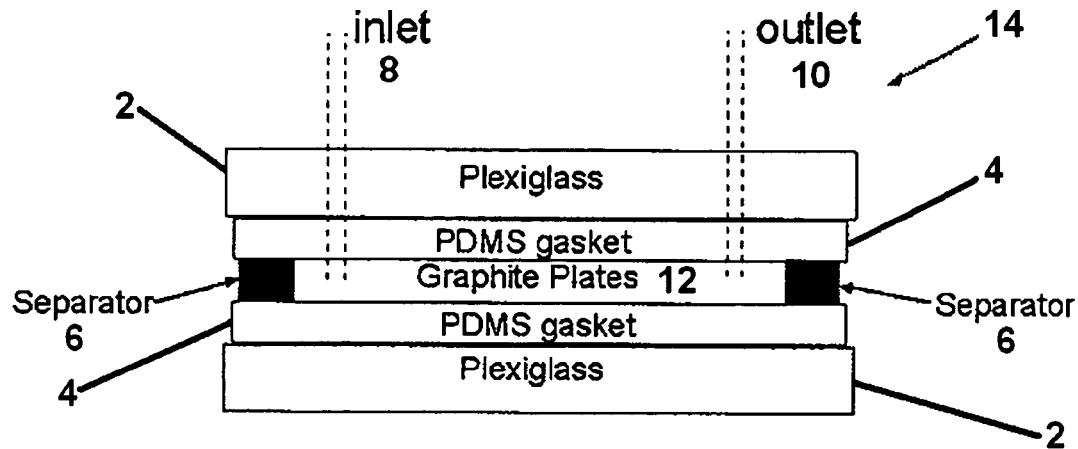
FIG. 1A is a schematic view of a layered assembly of an electrolytic cell, side view.

The present invention makes use of the discovery that the pH of individual streams in a multistream laminar flow device may be independently controlled, and that the formation of precipitates does not interfere with the operation of the device. When run as either a galvanic or electrolytic cell, the pH of the individual streams may be selected to optimize the chemical reaction within that individual stream. Furthermore, precipitates are less likely to form because products are swept away by the fluid flow, keeping the concentrations below those needed for precipitation, and any precipitates which do form are likewise swept away by the fluid flow.

The present invention makes possible fuel cells using carbon-containing fuels run at alkaline pH, since formation and resulting precipitation of carbonates will not interfere with operation of the device. Similarly, solids may be formed using an electrolytic cell, because any solid formed will be swept away.

The present invention makes possible fuel cells, including biofuel cells, that may use a different pH is the anodic and cathodic stream. This allows the pH of each stream to be selected for the best kinetics or reaction thermodynamics of the desired chemistry. In the case of biofuel cells, the pH may be selected based on the enzyme, enhancing the kinetics, thermodynamics, or stability of the enzyme.

The pH of any of the streams or fluids may be individually varied. The pH of the streams or fluids may be the same or different. Preferably, the pH of one or more of the streams or fluids may be at least 7.5, 8.0, 8.5 or 9.0. Preferably, the pH difference between the streams or fluids may be at least 0.1, 0.5, 1.0, 2.0, 3.0, or 4.0.

At least 2 electrodes are present, preferably an anode and a cathode. Optionally, at least one reference electrode is present. When used as a fuel cell, the fuel, present in one of the streams or fluids, is preferably a hydrocarbon, for example an alcohol (such as methanol or ethanol) or an acid (such as formic acid).

The inlets may meet at almost any angle, for example head-on (forming a "T" shape, with the channel forming the vertical part of the "T"), or at an angle (forming a "Y" shape, with the channel forming the vertical part of the "Y"). With more than two inlets, the angle formed with the channel by each inlet may be the same or different. The inlets may intersect the channel at different points along the length of the channel, and at different locations around the channel. Furthermore, the diameter of the inlets may be the same or different, and the path of each inlet may be straight, curved, or multiply curved (such as a spiral or squiggle); again each inlet may be the same or different. Similarly, the channel itself may be straight, curved, or multiply curved. In addition, the channel, as well as the inlets and outlet or outlets, may have any cross sectional shape (such as a circular, oval, square, rectangle, etc.).

An indicator of the flow regime for a fluid can be expressed as a dimensionless quantity known as the Reynolds number ($R_e$). The Reynolds number is defined as the ratio of inertial forces to viscous forces, and can be expressed as:

$$R_e = \rho v D_{eq}/\mu$$

where $D_{eq}$ is the equivalent diameter, $\rho$ is the density of the fluid in grams/cm$^3$, v is the linear velocity in meters/sec., and $\mu$ is the viscosity of the fluid in grams/(sec.)(cm). There is a transitional critical value of $R_e$ for any given geometry above which flow is said to be turbulent and below which flow is said to be laminar. For typical fluidic devices, the transition from laminar to turbulent flow has been empirically determined to occur around $R_e$=2100. Formulae to calculate $R_e$ for specific geometries are well known [51].

The flow of fluid through the channel may be controlled by the volumetric flow rate of the streams of fluid flowing into the inlets. The volumetric flow rate of the streams may be controlled independently, and thereby the relative size (or width) of the streams may be controlled. In this way, the channel may be much larger (preferably having a width at most 1 mm, more preferably 10 microns to 750 microns, most preferably 100 to 500 microns) than any individual stream (which, for example, may have a width of 80 microns). Controlling the relative size of the streams can be used to control the efficiency of the chemical system within the channel: A larger stream will allow more starting materials (or fuel) to come into contact with the electrode, while a smaller stream will increase the effective concentration of species produced at the electrode. The fluids flowing into the inlets, may be aqueous, non-aqueous, miscible with each other or immiscible.

One or more catalysts, including enzymes, may be present in the cell. The catalysts may be physically attached to the electrode, or the surface of the channel. Alternatively, the catalyst may be fixed within the channel, by being attached to beads, particles, a hydrogel, or a polymer mesh present within the channel. Catalysts may also be present in the fluid or fluids present in the channel; in this case, it is preferable to recycle the catalyst back into the fluids flowing through the channel.

FIGS. 1A and B exemplify an embodiment of the present invention. Although specific materials are specified in the figures, other materials with similar properties may also be used. There are four parts in the design shown of the cell 14 in FIGS. 1A and B: a support structure 12 that is clamped between two elastic slabs 4 and a rigid top and bottom support layer 2, together with an optional external reference electrode (not shown) that is placed close to an electrode. The clamping may be with a large clip, top and bottom plates held together by adjustable screws, or with heat sealable plastics or polymers. The elastic slabs may be made from any elastic material, such as that used in O-rings and gaskets. Since the goal with clamping is to prevent leakage, these parts may also be held together by a glue or sealant, avoiding the need for either or both the clamping and the elastic slabs. A separator 6 may be included to keep the electrodes (support structures 12) separated. The separators may be made from any insulating material. Preferably, graphite plates are used as the support structure of the microfluidic cell where the thickness and spacing of the graphite plates when assembled define the dimensions of the microfluidic channels with inlets 8 and outlet 10 that form the cell structure. Any conductive material may be used as the support structure, if they are to function as electrodes. Alternatively, an insulating support structure may be used, but then a conductive layer must be included on the portions defining at least a portion of the microfluidic channel, which will then be the electrodes of the cell. Such conductive layers may be formed by evaporation (such as the evaporation of gold), or by sputtering. They also serve as the substrate for catalysts, such as a nanoparticle-based catalyst or enzymes, if needed.

The electrodes may make contact (i.e. be contiguous with) any portion of the channel, or the full length of the channel. Preferably, a reference electrode is present, and may be present in the channel, by an outlet or inlet of the channel, or anywhere that it would be in contact with fluid as it flows into or out of the channel.

When the cell is an electrolytic cell, it requires electrical energy from an external source during operation. This may be provided by a power supply (which regulates the power to the cell; preferably the power supply is a DC power supply).

When used as an electrolytic cell, the cell includes a first electrode (for example, a working electrode) and a second electrode (for example, a counter electrode), and a channel contiguous with at least a portion of the first and second electrodes. The channel has at least two inlets and at least one outlet; three, four or more inlets are possible, for the inclusion of additional streams of fluid; similarly, two, three, four or more outlets are possible. Additional electrodes may also be present, for example multiple working electrodes, multiple counter electrodes, and one or more reference electrodes. Each fluid stream may have a different pH.

In these electrochemical cells, catalyst, if needed, is applied to the working electrode to form the active electrode area of the electrochemical cell. In some cases the catalyst is applied to the working electrode before insertion into the electrochemical cell. The graphite plates may be employed to serve the combined purposes of catalyst support, current collector, and the material that defines the geometry and dimensions of the channel structure through which the reactants flow.

Figure 5:
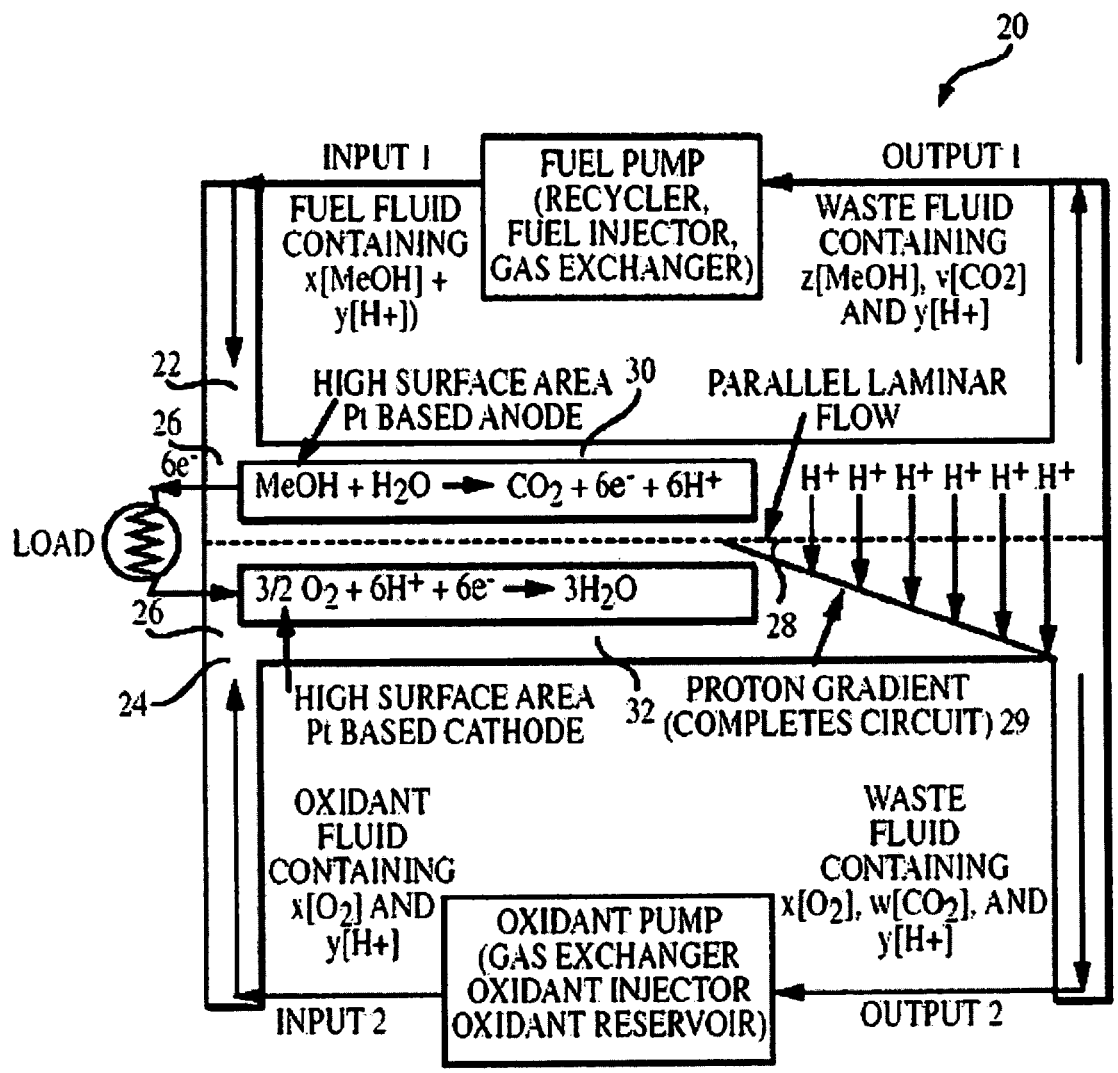
FIG. 5. shows a cross-sectional schematic illustration of a laminar flow fuel cell.

When used as a fuel cell under acidic conditions, the cell 20, as seen in FIG. 5, includes both the fuel input 22 (for example an aqueous solution containing MeOH) and the oxidant input 24, such as a solution containing oxygen and a proton source, are in liquid form. By pumping the two solutions into the channel 26, parallel laminar flow induces the interface 28 that is maintained during fluid flow. Rapid proton diffusion 29 completes the circuit of the cell as protons are produced at the anode 30 and consumed at the cathode 32. In this case, the interface 28 prevents the two solutions from mixing and allows rapid proton conduction to complete the circuit. When used as a fuel cell under alkaline conditions, hydroxyl ions will act as charge carriers within the streams. When used as a fuel cell with one stream alkaline and the other stream acidic, hydroxyl ions and protons, respectively, will be charge carriers.

Biofuel cells are well known [41, 52-56]. The optimum pH for stability, selectivity and catalysis of many enzymes is known, as well as method for immobilizing the enzymes and mediators on electrodes [41, 52-56].

EXAMPLES

LF-FC Fabrication

Graphite plates (EDM Supplies Inc., poco grade EDM-3, 0.0001 inch particle size) may serve three functions in the laminar flow-based micro fuel cells studied here (FIG. 1): (1) current collector, (2) catalyst support structure, and (3) edificial element. These graphite plates are placed side by side with a specific spacing, typically between 0.5 mm and 1.0 mm, and form the length of the channel where the fuel and oxidant streams flow next to each other. The inlets to this channel are milled out of the graphite plates with a drill bit at desired dimensions, typically 0.250 mm. Before assembling the fuel cell, catalyst is applied to the graphite plates. The capping layers of the design are 1-mm thick polycarbonate slabs, while thin films of polydimethylsiloxane (PDMS, Dow Corning) were used as gasket material between the polycarbonate and the graphite.

Catalyst Deposition

Catalyst suspensions for both anode and cathode were prepared at a concentration of 4.0 mg/ml catalyst in a 10% wt (with respect to the amount of catalyst) NAFION® solution (NAFION stock solution: Dupont, 5% w/w solution) and then a specific volume of the suspension was applied to those side faces of the graphite plates that line the microfluidic channel. Then solvent was evaporated by use of a heat lamp, thus letting the catalyst adhere to the side face of the respective graphite plates at the desired loading. The catalyst on the anode is unsupported Pt/Ru 50:50 atomic weight % alloy nanoparticles (Alfa Aesar, stock # 41171 lot # K28K14) in 10% wt NAFION solution at a loading of 2 mg/cm$^2$. The catalyst on the cathode electrode is unsupported Pt black nanoparticles (Alpha Aesar) in 10% wt NAFION solution at a loading of 2 mg/cm$^2$.

Chemicals

Methanol (Fisher Scientific) in varying concentrations in 18.3 MΩ-cm Millipore water was used as the fuel, and oxygen (S. J. Smith Welding Supply 99.99%) dissolved in 1 N sulfuric acid (Fisher Scientific) or 1 N potassium hydroxide (Fisher Scientific) in 18.3 MΩ-cm Millipore water as the oxidant. In order to saturate the oxidant solution with oxygen, oxygen was bubbled through the 1 N acidic or the 1 N alkaline solution for 15 minutes with a glass tube ending in a glass frit.

Fuel Cell Testing

Polyethylene tubing (Intramedic Pe 205, I.D. 1.57 mm.) was used to guide the fuel and oxidant into the LF-FC and to guide the waste stream out of the cell. Fluid flow in all fuel cell experiments was pressure driven and regulated using a syringe pump (Harvard Apparatus PHD 2000). The operating conditions for all data and experiments reported were: flow rate per inlet channel=0.3 ml/min; channel length=2.9 cm; channel height=1 mm and channel width=0.75 mm. This flow rate and these cell dimensions correspond to a Reynolds number of around 0.1, which is well within the laminar flow range. In order to analyze the individual performance of each electrode, an external Ag/AgCl reference electrode in a 3.0 M NaCl solution (BAS, West Lafayette, Ind.) was placed in a small compartment filled with 1 N sulfuric acid and connected to the laminar flow based fuel cell using capillary tubing (ID 1.57 mm) ending in the waste stream collection beaker. A detailed description of LF-FC analysis with this external reference electrode configuration can be found elsewhere [35]. Polarization curves were obtained using an in-house fabricated fuel cell testing station equipped with a data acquisition device (FP-1000 with FP-AI-100 and FP-TB-10 modules, from National Instruments, Austin, Tex.), and a user interface created with Labview (National Instruments, Austin, Tex.). During the experiment, the potential steps were controlled manually, and the current was recorded after reaching a steady state value.

Laminar Flow-based Fuel Cells

Figure 1B:
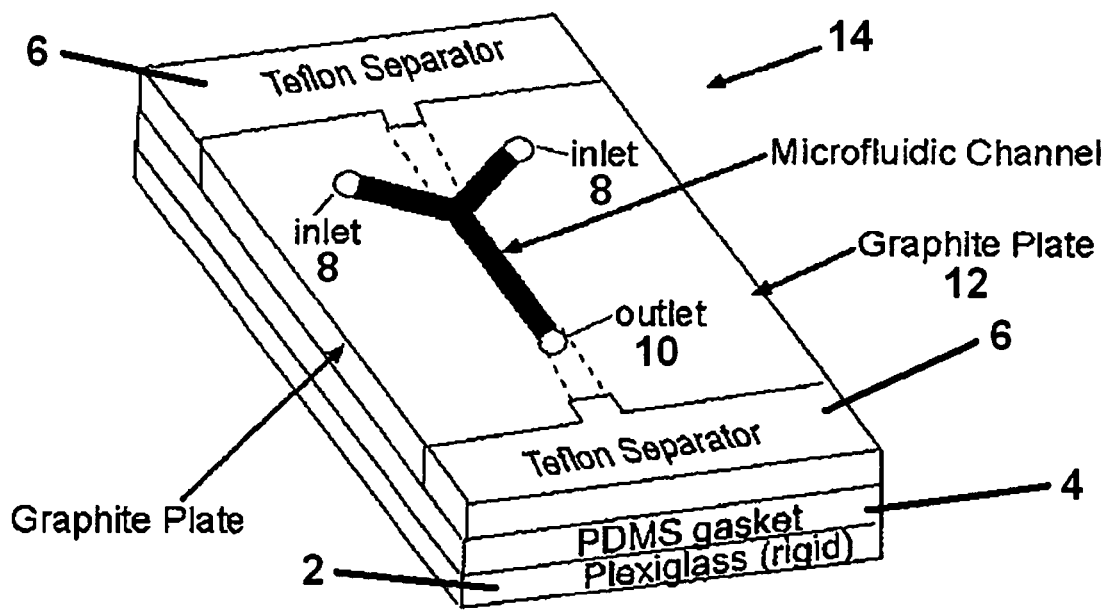
FIG. 1B is a schematic view of a layered assembly of an electrolytic cell, top view, with the top half of the cell removed to show internal detail.

In the LF-FC configuration used in this study the graphite plates serve the three purposes of catalyst support structure, current collector, and edificial element (FIG. 1). Unsupported catalytic Pt/Ru alloy nanoparticles (anode) and unsupported Pt nanoparticles (cathode) were applied to the sides of the graphite plates that line the microfluidic channel. Using cyclic voltammetry we determined a resultant surface roughness factor of approximately 500 for both nanoparticle-based catalysts used. A gasket material, for example polydimethylsiloxane, seals the top and bottom of the microfluidic channel. This three-layer assembly is clamped between two rigid polycarbonate support structures to obtain an LF-FC test cell that easily can be inspected visually. Also, graphite plates can be exchanged easily if needed. When injected through the inlets, fuel and oxidant solutions will merge at the Y-junction and continue to flow laminarly in parallel over the anode and cathode where fuel and oxidant are allowed to be oxidized and reduced respectively.

Media Flexibility in LF-FCs

As mentioned above, this membraneless, all liquid design eliminates issues related to fuel crossover, anode dry-out, and cathode flooding [16,18,19]. In addition, lack of a membrane also allows for operation of LF-FCs in media other than acidic media. Moreover, the chemical composition of the cathode and anode streams can be tailored individually to optimize individual electrode kinetics as well as overall cell potential. One has the freedom to decide to run the LF-FC in all-acidic, all-alkaline, or in a mixed-media mode in which the anode is exposed to acidic media while the cathode is exposed to alkaline media, or vice versa.

The pH of the electrolyte has an effect on reaction kinetics at the individual electrodes, as well as the electrode potential at which oxidation or reduction occurs [27,28,36-38]. Equations 1 & 2 and Equations 3 & 4 show the half-cell reactions and standard electrode potentials of methanol oxidation and oxygen reduction in acidic and in alkaline media, respectively. Equation 5 represents the overall cell reaction, in all-acid or all-alkaline media. Both the alkaline-alkaline case and the acidic-acidic case have a maximum theoretical open circuit potential (OCP) of 1.21 V.

Methanol/$O_2$ in Acidic Media:

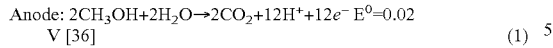

$$\text{Anode: } 2CH_3OH + 2H_2O \rightarrow 2CO_2 + 12H^+ + 12e^- \quad E^0 = 0.02 \text{ V [36]} \tag{1}$$

$$\text{Cathode: } 12H^+ + 12e^- + 3O_2 \rightarrow 6H_2O \quad E^0 = 1.23 \text{ V [37]} \tag{2}$$

Methanol/$O_2$ in Alkaline Media:

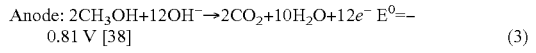

$$\text{Anode: } 2CH_3OH + 12OH^- \rightarrow 2CO_2 + 10H_2O + 12e^- \quad E^0 = -0.81 \text{ V [38]} \tag{3}$$

$$\text{Cathode: } 3O_2 + 6H_2O + 12e^- \rightarrow 12OH^- \quad E^0 = 0.40 \text{ V [37]} \tag{4}$$

Overall Reaction, All-acidic or all Alkaline Media:

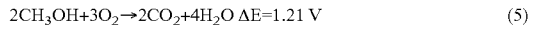

$$2CH_3OH + 3O_2 \rightarrow 2CO_2 + 4H_2O \quad \Delta E = 1.21 \text{ V} \tag{5}$$

Before running actual fuel cell experiments, we determined the open circuit potentials for an LF-FC while flowing anode and cathode streams of different pH, but in the absence of fuel and oxidant. Table 1 shows the open circuit potentials (±3%) in an LF-FC operated at a flow rate of 0.3 ml/min per channel, in the absence of fuel and oxidant for different anolyte and catholyte media composition combinations. At open circuit, both anode and cathode are slightly oxidized. The differing thermodynamics of Pt oxide formation in acid and in alkali create a significant OCP, 0.70V and −0.68V, respectively, when the cathode is alkaline and anode acidic and when the anode is acidic and the cathode is alkaline. The liquid-liquid junction potential (LJP) formed at the interface between the acidic and alkaline streams may reduce or increase the open circuit potential, depending on which stream is acidic and which is alkaline. The LJP may be estimated using the Henderson equation [39], yielding a maximum value of 32 mV in our experiments. Thus the LJP does not significantly contribute to the observed phenomena described below.

TABLE 1

| | Open Circuit Potentials | |
|---|---|---|
| Cathode | Anode | Potential (V) |
| 1.0 N $H_2SO_4$ | 1.0 N $H_2SO_4$ | −0.058 |
| 1.0 N $H_2SO_4$ | 1.0 N KOH | 0.700 |
| 1.0 N KOH | 1.0 N $H_2SO_4$ | −0.680 |
| 1.0 N KOH | 1.0 N KOH | 0.006 |

LF-FCs in All-acidic and All-alkaline Media

Figure 2:
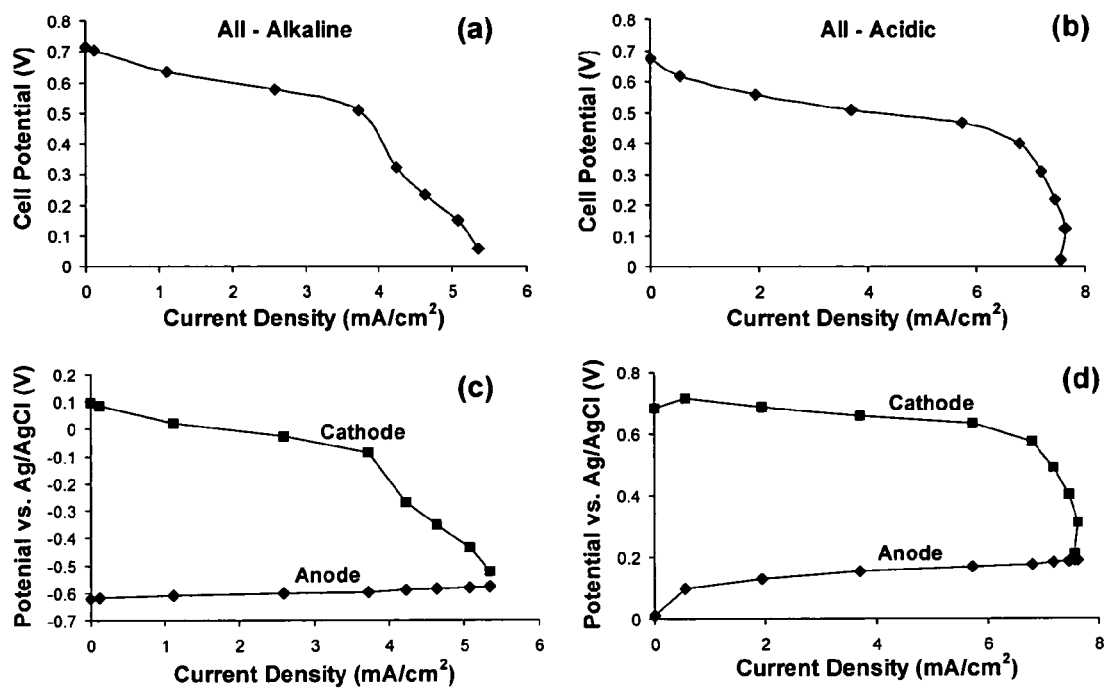
FIG. 2. Load curves for overall cell performance of an LF-FC operating in alkaline (a) and acidic media (b). (c) and (d): The corresponding I-V curves of individual electrode performances are shown in (c) and (d). For both experiments the fuel stream is 1.0 M methanol in 1N KOH (a, c) and in 1N $H_2SO_4$ (b, d) and the oxidant stream is oxygen saturated 1N KOH (a, c) and 1N $H_2SO_4$ (b, d).

FIGS. 2a and 2b show the performance of an LF-FC in all-acidic and all-alkaline media, respectively. Initially at low current densities both the polarization curves of FIGS. 2a and 2b are identical, and thus the performance of the LF-FC is independent of media. The mass transport limitation region, however, is reached much sooner at around 4 mA/cm² in the LF-FC running in alkaline media, versus around 7 mA/cm² in the LF-FC running in acidic media. To more accurately determine the cause of the mass transport limited area an external reference electrode was added to the system [35]. Use of an external reference electrode allowed for separate analysis and evaluation of individual electrode performance characteristics rather than just of the overall cell performance (sum of anode and cathode performances). FIGS. 2c and 2d show that the process in both acidic and alkaline media is cathode limited. This limitation can be attributed to the low oxygen concentration in solution. In acidic media the saturation concentration of oxygen is about 1 mM whereas the saturation concentration of oxygen in alkaline media is approximately 25% lower [40]. This difference in solubilities explains the earlier drop in performance in the I-V curve of the LF-FC experiment run in alkaline media (FIG. 2b) compared to that run in acidic media (FIG. 2a). Overpotentials of the individual electrodes in different media, as deduced from FIGS. 2c and 2d, are in agreement with those reported previously [28-30]. Multiple tests with the same LF-FC were run over several days without any drop in activity or performance. No issues with carbonate formation were encountered in this LF-FC, as any carbonate that does form is immediately removed from the system by the flowing streams.

Prophetic Example: All-Alkaline System with $CaCl_2$, Producing Precipitate

Addition of 1 M $CaCl_2$ to the fuel stream would create enough $CaCO_3$ to precipitate, since the anode is run at a pH of >7. The $CaCO_3$ that forms is swept away my the moving fluid, and does not interfere with operation of the device.

LF-FCs in Mixed Media #1: Acidic Anode, Alkaline Cathode

Figure 3:
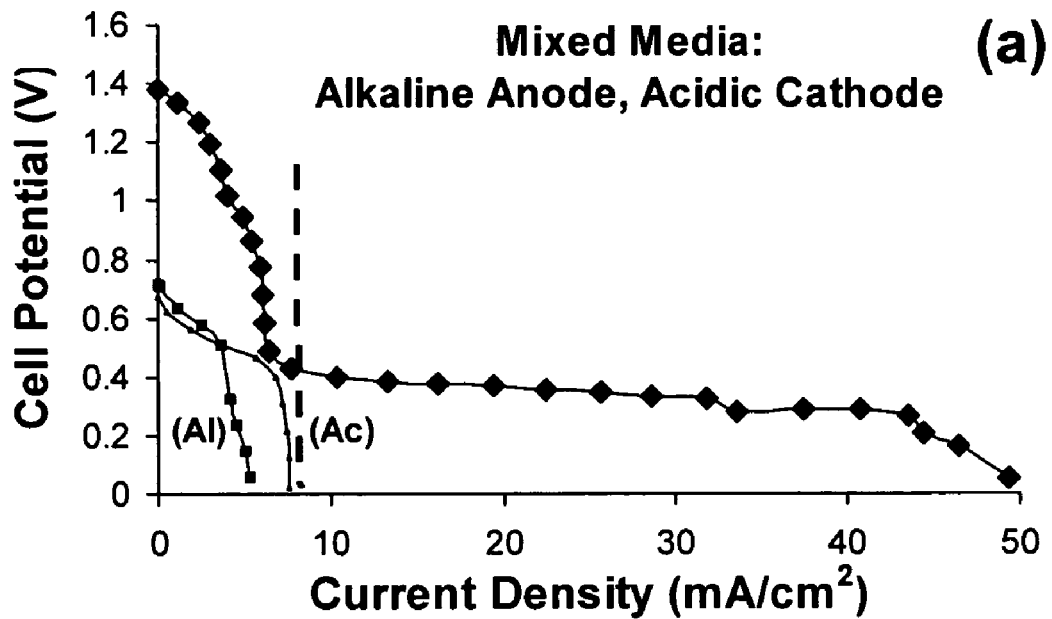
FIG. 3. (a) Load curve of an LF-FC with an alkaline anode and acidic cathode. For comparison, also the load curves of the LF-FCs run in all-alkaline (Al) and in all-acidic (Ac) media are included. (b) Corresponding individual electrode performance curves for the mixed-media configuration: Anode (top) and cathode (bottom). For this experiment the fuel stream is 1.0 M methanol in 1N KOH and the oxidant stream is an oxygen-saturated 1N $H_2SO_4$ solution.
Figure 3:
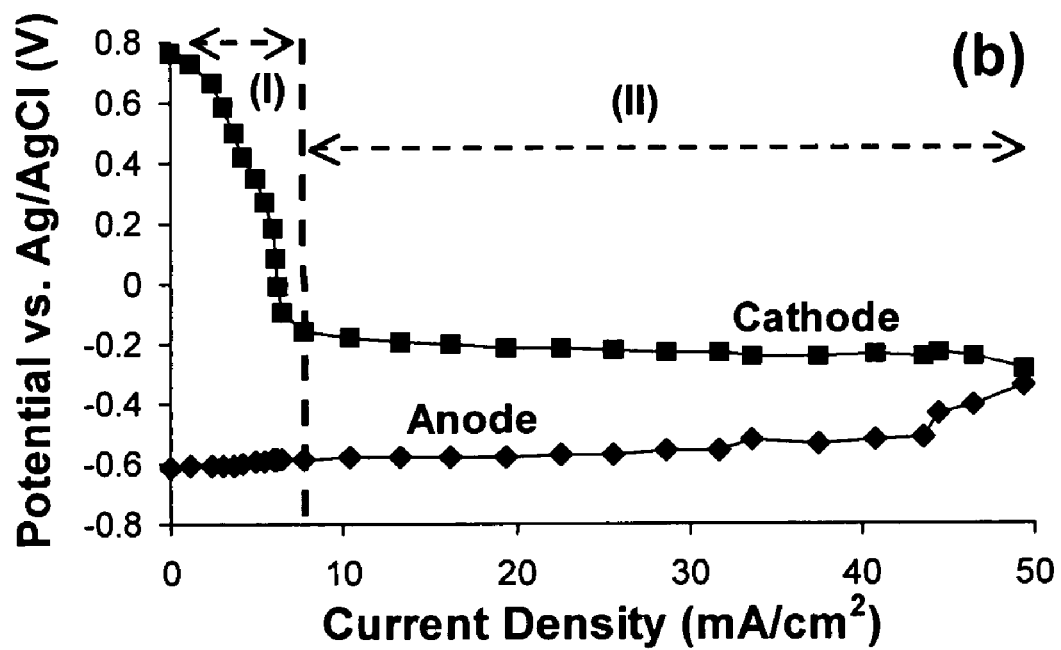

After studying LF-FC performance while operating in all-acidic and all-alkaline media (FIG. 3) we studied mixed-media systems in which one stream is acidic while the other stream is alkaline. Note that in mixed-media configurations the neutralization reaction of $OH^-$ and $H^+$ to water occurs at the liquid-liquid interface between the fuel and oxidant stream. This reaction is mildly exothermic, but we never observed an increase in temperature in the cell or in the outlet stream. The LF-FC cell dimensions and operation conditions used result in residence times and diffusional mixing zone widths that are such that local heating effects on the performance can be neglected in the flowing microfluidic fuel cell studied here. Two configurations were considered: an acidic anode stream combined with an alkaline cathode stream (mixed media #1), and an alkaline anode stream combined with an acidic cathode stream (mixed media #2). In the first configuration, the overall cell reaction, equation 6, can be obtained from equations 1 and 4:

Mixed Media #1: Acidic Anode, Alkaline Cathode

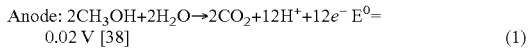
$$\text{Anode: } 2CH_3OH + 2H_2O \rightarrow 2CO_2 + 12H^+ + 12e^-\ E^0 = 0.02\text{ V [38]} \tag{1}$$

$$\text{Cathode: } 3O_2 + 6H_2O + 12e^- \rightarrow 12OH^-\ E^0 = 0.40\text{ V [37]} \tag{4}$$

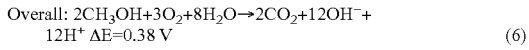
$$\text{Overall: } 2CH_3OH + 3O_2 + 8H_2O \rightarrow 2CO_2 + 12OH^- + 12H^+\ \Delta E = 0.38\text{ V} \tag{6}$$

The maximum theoretical OCP is 0.38 V in this mixed media configuration #1. An OCP of less than 0.1 V is observed due to the overpotentials on the cathode and anode. The energy liberated in the methanol oxidation and oxygen reduction reactions is mostly consumed by the water ionization reaction. This configuration, which couples an electrolytic reaction with a galvanic reaction, is thus incapable of yielding useful amounts of energy, and was not studied any further.

LF-FCs in Mixed Media #2: Alkaline Anode, Acidic Cathode

In contrast, in mixed media configuration #2 use of an alkaline anode stream (Eq. 3) and an acidic cathode stream (Eq. 2) allows energy to be obtained both from the methanol oxidation/oxygen reduction reactions and from the acid/alkali electrochemical neutralization reactions, as evident from the overall cell reaction (Eq. 7):

Mixed Media 2a: Alkaline Anode, Acidic Cathode (Region I, FIG. 3b)

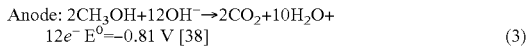
$$\text{Anode: } 2CH_3OH + 12OH^- \rightarrow 2CO_2 + 10H_2O + 12e^-\ E^0 = -0.81\text{ V [38]} \tag{3}$$

$$\text{Cathode: } 12H^+ + 12e^- + 3O_2 \rightarrow 6H_2O\ E^0 = 1.23\text{ V [37]} \tag{2}$$

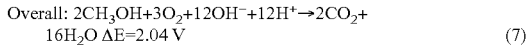
$$\text{Overall: } 2CH_3OH + 3O_2 + 12OH^- + 12H^+ \rightarrow 2CO_2 + 16H_2O\ \Delta E = 2.04\text{ V} \tag{7}$$

The coupling of the two galvanic reactions in this configuration yields a desirable high theoretical OCP of 2.04 V. However, because of the overpotentials resulting from the slow kinetics of oxygen reduction and methanol oxidation, the open circuit potential is reduced to a measured value of 1.4 V (FIG. 3a). For comparison, typical PEM-based direct methanol fuel cells (DM-FCs) typically have OCPs of 0.5-0.7 V and would be operated at a cell potential of 0.35-0.45 V [See for example 1]. Note that sustained high potentials at usable current densities directly translate into higher power densities.

This LF-FC run in the acidic cathode/alkaline anode configuration is still limited by oxygen mass transfer. The poor oxygen supply causes the cathode potential to drop from around 0.8 V at open circuit to about -0.2 V (both vs. Ag/AgCl) at about 7 mA/cm² (region I in FIG. 3b), the same current density at which the all-acidic LF-FC reaches its cathode-limited performance regime (FIG. 2d).

At higher current densities, a unique phenomenon for fuel cells is observed: once the potential of the cathode of the LF-FC in this mixed-media configuration reaches approximately -0.2 V vs. Ag/AgCl, an unusual tail in the acidic cathode polarization curve (region II in FIG. 3b) appears. The cell potential remains almost constant at 0.35-0.40 V over the 8-40 mA/cm² current density range. This phenomenon occurs when proton reduction (Eq. 8) becomes an additional cathode reaction. At high current densities, proton reduction surpasses oxygen reduction (Eq. 2) to become the predominant cathode reaction. The ability of proton reduction to occur at current densities much higher than the oxygen reduction limiting current density is due to the much larger concentration of protons, $[H^+] = 1$ M versus $[O_2] \approx 2$ mM, leading to the overall cell reaction of equation 9:

Mixed Media 2b: Alkaline Anode, Acidic Cathode (Region II, FIG. 3b)

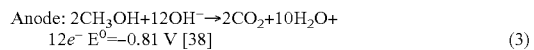
$$\text{Anode: } 2CH_3OH + 12OH^- \rightarrow 2CO_2 + 10H_2O + 12e^-\ E^0 = -0.81\text{ V [38]} \tag{3}$$

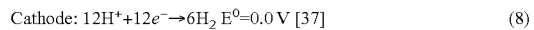
$$\text{Cathode: } 12H^+ + 12e^- \rightarrow 6H_2\ E^0 = 0.0\text{ V [37]} \tag{8}$$

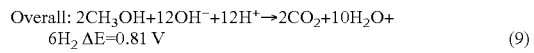
$$\text{Overall: } 2CH_3OH + 12OH^- + 12H^+ \rightarrow 2CO_2 + 10H_2O + 6H_2\ \Delta E = 0.81\text{ V} \tag{9}$$

In this high current density regime of this mixed media LF-FC (Region II, FIG. 3b), the current density continues to increase at a constant cathode potential until the anode becomes the limiting factor. The anode potential slightly increases over the 8-40 mA/cm² range until a rapid increase at current densities larger than 42 mA/cm² due to mass transfer limitations (FIG. 3b). Such mass-transfer limited behavior is commonly observed for methanol oxidation under these conditions [29,34].

Operating in this mixed media configuration, with an alkaline anode and an acidic cathode, resulted in a higher overall cell potential than those obtained for the all-acidic and all-alkaline LF-FC experiments. For example, at a potential of 0.8 V, the mixed media configuration provides a current density of 7 mA/cm², whereas both the all-acidic and all-alkaline cells already start from a lower OCP, and thus have cell potentials that are significantly lower than those of the mixed-media configuration. Moreover, a current density of 7 mA/cm² is unattainable for the all-alkaline configuration, while the all-acidic configuration has a cell potential of less than 0.35 V at this current density.

Figure 4:
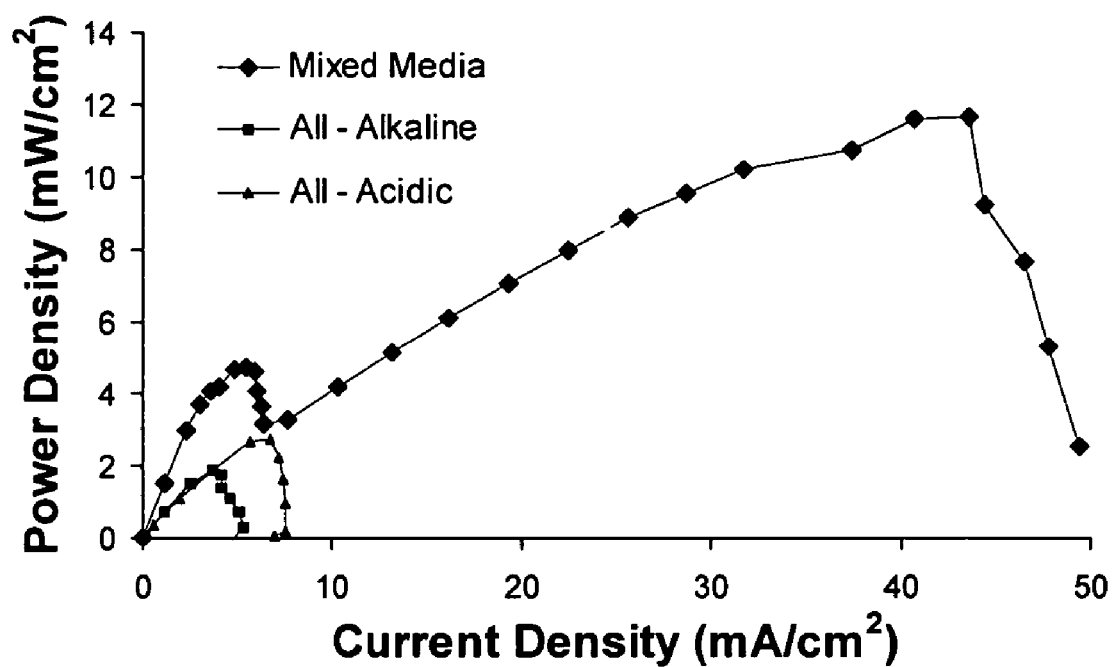
FIG. 4. Power density curves for overall cell performance of an LF-FC operating in alkaline (1N KOH), acidic (1N $H_2SO_4$), and mixed media (Anode: 1N KOH and Cathode: 1N $H_2SO_4$). For all experiments the fuel stream is 1M methanol, and the oxidant stream is an oxygen-saturated solution in the respective media.

FIG. 4 shows the power density curves of the three LF-FC experiments performed in different media combinations at the anode and cathode. While the all-acidic and all-alkaline LF-FC experiments have maximum power densities of 2.4 mW/cm² and 2.0 mW/cm², respectively, both at a cell potential of about 0.5 V, the mixed media experiment results first in a local power density maximum of almost 5 mW/cm² at a cell potential of about 1 V. Within this sub-10 mA/cm² regime, the mixed media fuel cell clearly outperforms both the all-acidic and all-alkaline fuel cell. At current densities above 10 mA/cm² the mixed media fuel cell reaches an even higher global maximum power density of 12.0 mW/cm² due the unusual tail in the cathode potential caused by proton reduction. The higher power densities in the mixed-media LF-FC are a direct result of higher overall cell potentials due to the unprecedented ability to operate the cathode and anode at different pH in an LF-FC.

In the previously discussed all-acidic and all-alkaline configurations, the $OH^-$ and $H^+$ species, respectively, are reactants at both the electrodes, but there is no net generation or consumption. In any future all-alkaline or all-acidic LF-FC-based fuel cell system these alkaline and acidic streams would be recirculated with continuous replenishment of oxidant and fuel. In contrast, in the mixed-media LF-FC the $OH^-$ and $H^+$ species are both being consumed in the net overall cell reaction (Eq. 7 and 9), thus requiring continuous replenishment of these reagents in any future LF-FC-based fuel cell system. Most of the observed extra power density for the mixed-media configuration is supplied by the electrochemical acid-base neutralization reaction where protons are reduced on the cathode (Eq. 8) and hydroxide ions are consumed when methanol is oxidized at the anode (Eq. 2). The consumption of $H_2SO_4$ and KOH thus must be taken into account when comparing the different LF-FC configurations with respect to energy density (power per unit mass) and thus also in the development of LF-FC-based fuel cell systems.

In the alkaline anode/acidic cathode mixed-media configuration both $OH^-$ and $H^+$ are consumed at the anode and cathode, respectively, at a rate of six for each molecule of methanol (Eq. 2 and Eq. 8). The maximum theoretical energy density (based on the reaction of one mole of methanol with ambient oxygen, consuming six equivalents of $H_2SO_4$ and KOH) is 495 W-h/kg, much lower than the theoretical value for the all-alkaline and all-acidic LF-FCs in which only methanol is consumed (6000 W-h/kg). Even when lighter sources for acid and base would be used, i.e. HCl and NaOH, the maximum theoretical energy density is only 866 W-h/kg, only ⅐ of the maximum in which only methanol is consumed. When practical limitations are considered, the actual energy density attainable with a mixed-media LF-FC would be comparable or possibly lower than that of a lithium ion battery (around 150 W-h/kg).

Prophetic Example: Biofuel Cell Using Different pH Streams for the Anode and Cathode Laccase mediated by PVI complexed with Os(dimethylbipyridine)(terpyridine) is immobilized at the cathode, and glucose oxidase mediated by a poly(vinylimidazole)-poly(acrylamide) copolymer complexed with Os(dimethylbipyridine)$_2$Cl at the anode, using the procedures described by Chen et al. [52]. Graphite plates may be used as the cathode and anode. The cathode stream has a pH of 4 or 5, using a citrate buffer [52], and the anode stream has a pH of 7.1, using a phosphate buffer [53].

REFERENCES

1. S. C. Kelley, G. A. Deluga, W. H. Smyri, AIChE Journal 48 (2002) 1071.
2. H. Maynard, J. Meyers, Vac. Sci. Technol., B 20 (2002) 1287.
3. B. Steele, A. Heinzel, Nature 414 (2001) 345.
4. G. Q. Lu, C. Y. Wang, T. J. Yen, X. Zhang, Electrochim. Acta 49 (2004) 821.
5. J. Yeom, G. Z. Mozsgai, A. Asthana, B. R. Flachsbart, P. Waszczuk, E. R. Choban, P. J. A. Kenis, M. A. Shannon, First Int. Conf. on Fuel Cell Sci., Engr. and Tech., Rochester, N.Y., 21-23 Apr., 2003.
6. J. Yeom, J. S. Ranga, G. Z. Mozsgai, A. Asthana, E. R. Choban, M. Mitchell, P. J. A. Kenis, M. A. Shannon, Hilton Head 2004, A Solid State Sensor, Actuator and Microsystems Workshop, Hilton Head Island, S.C., 6-10 Jun., 2004.
7. J. Yeom, G. Z. Mozsgai, B. R. Flachsbart, E. R. Choban, A. Asthana, M. A. Shannon, P. J. A. Kenis, Sens. Actuators, B in press.
8. S. J. Lee, A. Chang-Chien, S. W. Cha, R. O'Hayre, Y. I. Park, Y. Saito, F. B. Prinz, J. Power Sources 112 (2002) 410.
9. R. Hahn, S. Wagner, A. Schmitz, H. Reichl, J. Power Sources 131 (2004) 73.
10. S. Mitrovski, L. Elliott, R. Nuzzo, Langmuir 20 (2004) 6974.
11. J. Meyers, H. Maynard, J. Power Sources 109 (2002) 76.
12. S. Kelley, G. Deluga, W. H. Smyrl, Electrochem. Solid-State Lett. 3 (2000) 407.
13. T. Yen, N. Fang, X. Zhanga, G. Q. Lu, C. Y. Wang, Appl. Phys. Lett. 83 (2003) 4056.
14. S. Motokawa, M. Mohamedi, T. Momma, S. Shoji, T. Osaka, Electrochem. Commun. 6 (2004) 562.
15. S. Ha, B. Adams, R. I. Masel, J. Power Sources 128 (2004) 119.
16. E. R. Choban, L. J. Markoski, A. Wieckowski, P. J. A. Kenis, J. Power Sources 128 (2004) 54.
17. P. J. A. Kenis, R. F. Ismagilov, G. M. Whitesides, Science 285 (1999) 83.
18. E. R. Choban, P. Waszczuk, L. J. Markoski, A. Wieckowski, P. J. A. Kenis, First Int. Conf. on Fuel Cell Sci., Engr. and Tech., Rochester, N.Y., 21-23 Apr., 2003.
19. E. R. Choban, L. J. Markoski, J. Stoltzfus, J. S. Moore, P. J. A. Kenis, 40th Power Sources Conf., Cherry Hill, N.J., 10-13 Jun., 2002.
20. R. F. Ismagilov, A. D. Stroock, P. J. A. Kenis, G. M. Whitesides, Appl. Phys. Lett. 76 (2000) 2376.
21. A. E. Kamholz, B. H. Weigl, B. A. Finlayson, P. Yager, Anal. Chem. 71 (1999), 5340.
22. P. J. A. Kenis, R. F. Ismagilov, S. Takayama, G. M. Whitesides, S. Li, H. S. White, Acc. Chem. Res. 33 (2000) 841.
23. R. Ferrigno, A. D. Stroock, T. D. Clark, M. Mayer, G. M. Whitesides, J. Am. Chem. Soc. 125 (2003) 2014.
24. M. Krishnan, V. Namasivayam, R. Lin, R. Pal, M. A. Burns, Biotechnology 12 (2001) 92.
25. B. Zheng, J. D. Tice, R. F. Ismagilov, Adv. Mater. 16 (2004) 1365.
26. J. L. Cohen, D. A. Westly, A. Pechenik, H. D. Abruna, J. Power Sources in press.
27. J. Spendelow, G. Q. Lu, P. J. A. Kenis, A. Wieckowski, J. Electroanal. Chem. 568 (2004) 215.
28. G. F. McLean, T. Niet, S. Prince-Richard, N. Djilali, Int. J. Hydrogen Energy 27 (2002) 507.
29. J. Prabhuram, R. Manoharan, J. Power Sources 74 (1198) 54-61.
30. A. V. Tripkovic, K. Dj. Popovic, J. D. Lovic, V. M. Jovanovic, A. Kowal, J. Electroanal. Chem. 572 (2004) 119-128.
31. E. Agel, J. Bouet, J. Fauvarque, J. Power Sources 101 (2001) 267.
32. Y. Wang, L. Li, L. Hu, L. Zhuang, J. Lu, B. Xu, Electrochem. Commun. 5 (2003) 662.
33. T. Danks, R. Slade, J. Varcoe, J. Mater. Chem. 13 (2003) 712.
34. E. H. Yu, K. Scott, Journal of Power Sources 137 (2004) 248-256.
35. E. R. Choban, P. Waszczuk, P. J. A. Kenis, submitted.
36. T. Iwasita, Electrochim. Acta 47 (2002) 3663.
37. D. R. Lide (Ed.), CRC Handbook of Chemistry and Physics, 85th ed., CRC Press LCC, MARC Records Transmitter System, 2004-2005.
38. E. H. Yu, K. Scott, J. Power Sources 137 (2004) 248.
39. A. J. Bard, L. R. Faulkner, Electrochemical Methods—Fundamentals and Applications, 2nd ed. John Wiley & Sons, Inc., New York, Chichester, Weinheim, Brisbane, Singapore, Toronto, 2001.
40. R. C. Weast, D. R. Lide, M. J. Astle, W. H. Beyer (Eds.), CRC Handbook of Chemistry and Physics, 70th ed., CRC Press, Inc., Boca Raton, Fla., 1989-1990.

41. S. C. Barton, J. Gallaway, P. Atanassov, Chem. Rev., 104 (2004), 4867.

42. E. Kissa (Ed.), Fluorinated Surfactants: Synthesis-Properties-Applications, 1st ed. Marcel Dekker, New York, N.Y., 1994.

43. E. R. Choban, P. Waszczuk, L. J. Markoski, P. J. A. Kenis, unpublished results.

44. http://www.fctec.com/fctec_types_afc.asp (2005).

45. http://www.visionengineer.com/env/al.php (2005).

46. http://www.fuelcellmarkets.com/article_default_view.fcm?articleid=6194&subsite=912 (2005).

47. Kenis, et al., MICROFLUIDIC DEVICE AND SYNTHETIC METHODS, U.S. patent application Ser. No. 10/844,058 (filed May 11, 2004).

48. Markoski, et al. EMULSIONS FOR FUEL CELLS, Published U.S. patent application no. 2004/0265681 A1 (Dec. 30, 2004).

49. Markoski, et al. ELECTROCHEMICAL CELLS COMPARISING LAMINAR FLOW INDUCED DYNAMIC CONDUCTING INTERFACES, ELECTROMIC DEVICES COMPRISING SUCH CELLS, AND METHODS EMPLOYING SAME, U.S. Pat. No. 6,713,206 (Mar. 30, 2004).

50. D. A. Skoog and D. M. West, "FUNDAMENTALS OF ANALYTICAL CHEMISTRY", 4$^{th}$ ed., p. 306, CBS College Publishing (1982).

51. G. T. A. Kovacs "MICROMACHINED TRANSDUCERS: SOURCEBOOK" McGraw-Hill, Boston (1998).

52. Chen, T.; Calabrese Barton, S.; Binyamin, G.; Gao, Z.; Zhang, Y.; Kim, H.-H.; Heller, A. *J. Am. Chem. Soc.* (2001) 123, 8630.

53. Mano, N.; Mao, F.; Heller, A. *J. Am. Chem. Soc.* (2002) 124, 12962.

54. Kim, H. H.; Mano, N.; Zhang, X. C.; Heller, A. *J. Electrochem. Soc.* (2003) 150, A209.

55. Mano, N.; Heller, A. *J. Electrochem. Soc.* (2003) 150, A1136.

56. Mano, N.; Mao, F.; Heller, A. *J. Am. Chem. Soc.* (2003) 125, 6588.

What is claimed is:

1. An electrochemical cell, comprising:
   (a) a first electrode,
   (b) a second electrode,
   (c) a first fluid, in contact with the first electrode, and
   (d) a second fluid, in contact with the second electrode,
   wherein the first fluid and the second fluid are in parallel laminar flow, and the first fluid enters the electrochemical cell with a pH different from the second fluid,
   the cell is a galvanic cell,
   the cell is a fuel cell,
   the first fluid comprises a hydrocarbon, and
   the first fluid has a pH of at least 7.5.

2. An electrochemical cell, comprising:
   (a) a first electrode,
   (b) a second electrode,
   (c) a first fluid, in contact with the first electrode, and
   (d) a second fluid, in contact with the second electrode,
   wherein the first fluid and the second fluid are in parallel laminar flow, and the first fluid enters the electrochemical cell with a pH different from the second fluid,
   the cell is a galvanic cell,
   the cell is a fuel cell,
   the first fluid comprises a hydrocarbon, and
   the first fluid has a pH of at least 9.

3. An electrochemical cell, comprising:
   (a) a first electrode,
   (b) a second electrode,
   (c) a first fluid, in contact with the first electrode, and
   (d) a second fluid, in contact with the second electrode,
   wherein the first fluid and the second fluid are in parallel laminar flow, and the first fluid enters the electrochemical cell with a pH different from the second fluid,
   the cell is a galvanic cell,
   the cell is a fuel cell, and
   the electrochemical cell produces a precipitate.

4. A fuel cell, comprising:
   (a) an anode,
   (b) a cathode,
   (c) an anodic fluid, in contact with the anode, and
   (d) a cathodic fluid, in contact with the cathode,
   wherein the anodic fluid and the cathodic fluid are in parallel laminar flow, and at least one of the anodic fluid and the cathodic fluid enters the fuel cell with a pH above 7.5,
   wherein fuel for the fuel cell comprises a hydrocarbon.

5. The electrochemical cell of claim 4, wherein at least one of the anodic fluid and the cathodic fluid has a pH above 9.0.

6. The fuel cell of claim 4, wherein the hydrocarbon is methanol, ethanol or formic acid.

7. The fuel cell of claim 4, further comprising an enzyme in contact with the anode, the cathode, or both the anode and the cathode.

8. The fuel cell of claim 4, wherein the fuel cell produces a precipitate.

9. A method of generating electricity, comprising:
   flowing a first and second liquid through a channel in parallel laminar flow;
   wherein the first fluid is in contact with a first electrode and the second liquid is in contact with a second electrode,
   complementary half cell reactions take place at the first and the second electrodes, respectively, and
   a precipitate is produced.

10. The electrochemical cell of claim 1, wherein a difference in the pH of the first fluid and the pH of the second fluid is at least 0.1.

11. The electrochemical cell of claim 2, wherein a difference in the pH of the first fluid and the pH of the second fluid is at least 0.1.

12. The electrochemical cell of claim 3, wherein a difference in the pH of the first fluid and the pH of the second fluid is at least 0.1.

13. The electrochemical cell of claim 1, wherein the first electrode is an anode and the second electrode is a cathode.

14. The electrochemical cell of claim 2, wherein the first electrode is a an anode and the second electrode is a cathode.

15. The electrochemical cell of claim 3, wherein the first electrode is a an anode and the second electrode is a cathode.

16. The electrochemical cell of claim 1, wherein the hydrocarbon is methanol, ethanol or formic acid.

17. The electrochemical cell of claim 2, wherein the hydrocarbon is methanol, ethanol, or formic acid.

* * * * *